US005997965A

United States Patent [19]
Shimazu et al.

[11] Patent Number: 5,997,965
[45] Date of Patent: Dec. 7, 1999

[54] STRIPPING FINGER

[75] Inventors: Eiichiroh Shimazu; Noboru Umemoto, both of Mie-ken; Fuminori Satoji, Yokkaichi, all of Japan

[73] Assignee: NTN Corporation, Osaka, Japan

[21] Appl. No.: 09/040,894

[22] Filed: Mar. 18, 1998

[51] Int. Cl.[6] .................................................. C09K 19/00
[52] U.S. Cl. ............................... 428/1; 271/307; 271/311; 271/312; 271/313; 271/900; 428/325; 428/328; 428/329; 428/330; 428/421; 428/473.5; 428/480; 428/524; 428/702; 428/704
[58] Field of Search ........................... 428/1, 473.5, 524, 428/702, 704, 902, 903, 421, 480, 325, 328, 329, 330; 271/307, 900, 311, 312, 313

[56] References Cited

U.S. PATENT DOCUMENTS

| 5,364,670 | 11/1994 | Satoji et al. ................................ 428/1 |
| 5,518,781 | 5/1996 | Nakamura et al. .......................... 428/1 |

FOREIGN PATENT DOCUMENTS

| 62-245274 | 10/1987 | Japan . |
| 2183287 | 7/1990 | Japan . |
| 2247676 | 10/1990 | Japan . |
| 3148683 | 6/1991 | Japan . |
| 3153279 | 7/1991 | Japan . |
| 5107977 | 4/1993 | Japan . |
| 5173444 | 7/1993 | Japan . |
| 760286 | 6/1995 | Japan . |
| 795213 | 10/1995 | Japan . |
| 2598034 | 1/1997 | Japan . |
| 9106211 | 4/1997 | Japan . |

*Primary Examiner*—Nasser Ahmad
*Attorney, Agent, or Firm*—Hedman, Gibson & Costigan, P.C.

[57] ABSTRACT

A stripping finger, for use in an electrophotographic apparatus, formed by molding a glass polymer consisting of phosphate glass and resin. The stripping finger does not attack the peripheral surface of a roller of the electrophotographic apparatus. The material of the stripping finger can be molded precisely by injection molding; has a sufficient degree of heat load resistance, heat deformation property, and heat fatigue resistance; and is capable of maintaining the original shape of its tip.

14 Claims, 2 Drawing Sheets

STRIPPING FINGER

BACKGROUND OF THE INVENTION

The invention relates to a stripping finger for use electrophotographic apparatus such as a copying machine and a laser beam printer. The stripping finger strips a paper from rollers, especially a fixing roller which requires a heat resistant property.

A plurality of rollers is provided in an electrophotographic apparatus such as a copying machine, a laser beam printer, and the like to develop an electrostatic latent image formed on a photosensitive drum onto a sheet of paper, using toner and then fix the toner image to the paper. The photosensitive drum and an oil-applying roller are provided at a development section of the electrophotographic apparatus, except an electrophotographic apparatus of dry type. A fixing roller and a pressure roller are provided at a fixing section thereof. A stripping finger is provided on each of the photosensitive drum, the fixing roller, and the pressure roller to smoothly discharge the paper without the paper being caught by them.

The stripping finger scoops the end of the paper with its tip in contact with the peripheral surface of the fixing roller, thus preventing the paper from being caught by the fixing roller.

The stripping finger which is used in the development section is not required to have resistance to a high temperature because the photosensitive drum is not required to be heated, but to have a sliding contact characteristic not to damage the photosensitive drum which is comparatively soft.

The stripping finger which is used in the fixing section is required to have resistance to a high temperature because the fixing roller has a heater inside it and thus the surface thereof is kept at a high temperature and in addition, property of preventing fused toner from sticking thereto.

The stripping finger disclosed in each of Laid-Open Japanese Patent Publication Nos. 5-173444 and 6-194989 is formed of a resin composition containing whisker and solid lubricant added to thermoplastic polyimide resin prepared from 4,4'-bis (3-aminophenoxy) biphenyl and pyromellitic dianhydride. The stripping finger disclosed in Laid-Open Japanese Patent Publication No. 5-107977 is formed of a resin composition containing thermotropic liquid crystal polymer to which a glass-like carbon is added.

In recent years, processing speed has become faster and compact and light weight electrophotographic apparatuses are manufactured. In addition, they are required to have a higher reliability. Thus, the fixing roller is required to withstand a high temperature and rotate at a high speed. Consequently, the stripping finger is required to have the following characteristics (1)–(5) for higher quality, higher reliability, and longer life.

(1) The stripping finger has a low frictional resistance to the peripheral surface of the fixing roller and does not have property of attacking the peripheral surface thereof.

(2) The material of the stripping finger can be molded by injection and with high precision.

(3) The stripping finger has property of preventing toner from sticking thereto or the material thereof can be treated to have property of preventing toner from sticking thereto.

(4) The stripping finger has a high degree of heat load resistance, heat deformation property (more than 250° C.), and heat fatigue resistance (more than 200° C.).

(5) The tip of the stripping finger has a high degree of heat load resistance and maintains its original shape reliably even when the stripping finger is used successively.

However, the conventional stripping finger formed by molding thermoplastic polyimide resin or liquid crystal polymer does not contain a sufficient amount of filler and solid lubricant which are required to allow the stripping finger to have superior mechanical strength and wear and friction characteristics. This is because the addition of the filler and the solid lubricant to the thermoplastic polyimide resin or the liquid crystal polymer leads to deterioration of the moldability of the thermoplastic polyimide resin or the liquid crystal polymer. Therefore, the conventional stripping finger does not have the above characteristics (1)–(5) required for them at a satisfactory level.

SUMMARY OF THE INVENTION

It is an object of the present invention to provide a reliable stripping finger which does not attack the peripheral surface of a roller; is made of a material which can be molded into a precise configuration in injection molding; has a sufficient degree of heat load resistance, heat deformation property, and heat fatigue resistance; and is capable of maintaining the original shape of its tip.

It is another object of the present invention to provide a stripping finger which can be preferably used for a fixing roller of an electrophotographic apparatus.

The stripping finger of the present invention is used for an electrophotographic apparatus and formed by molding a glass polymer consisting of a phosphate glass and a resin. The glass polymer consists of 20–80 wt % of the phosphate glass and 20–80 wt % of the resin. The glass polymer further contains 5–35 wt % of a filler. That is, the stripping finger consists of 95–65 wt % of the glass polymer consisting of 20–80 wt % of the phosphate glass and 20–80 wt % of the resin; and 5–35 wt % of the filler.

The filler is a whisker having a PH value in the range of 5–9. The resin comprises at least one resin selected from the group consisting of a liquid crystal polyester resin, a polyetherimide resin, a polysulfone resin, and polyetherether ketone resin.

The stripping finger of the present invention has a thin layer of a fluorine-containing compound formed on a surface thereof. The stripping finger is used at a fixing section of an electrophotographic apparatus.

Because the stripping finger of the present invention contains the glass polymer, it can contain as much as 20–80 wt % of the phosphate glass. Further, the moldability of the material of the stripping finger is excellent. Therefore, unlike a conventional stripping finger comprising liquid crystal polymer, the stripping finger of the present invention is not cracked in molding the material and has a high degree of weld strength. In addition, the problem of filling of resin at the tip thereof can be solved. Thus, the stripping finger is highly dependable.

DETAILED DESCRIPTION OF THE PREFERRED EMBODIMENTS

Figure 1:
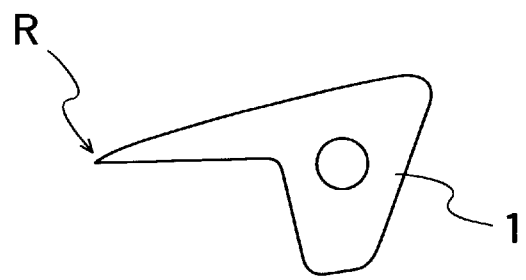
FIG. 1 is a side elevation showing a stripping finger of the present invention.

An example of a stripping finger of the present invention will be described below with reference to FIG. 1 which is a side elevation showing the stripping finger. A stripping finger 1 is as thin as several millimeters. The tip of the stripping finger 1 has an acute angle. The angle of the tip of the stripping finger 1 is not limited to a specific acute angle. Favorably, the angle is less than 60°, more favorably, less than 45°, and most favorably, less than 30° and the lowest angle is 5° or more.

If the angle of the tip of the stripping finger 1 is larger than the specified largest acute angle, the stripping finger 1 cannot have the indispensable function of separating sheets of paper from a fixing roller. On the other hand, if the angle of the tip of the stripping finger 1 is smaller than the specified smallest angle, the thickness of the stripping finger 1 in the periphery of the tip is so small that the paper is caught by the tip. Consequently, the paper is jammed or an excess force is applied to the periphery of the tip.

The radius of curvature R of the stripping finger 1 at its tip is set to be less than the thickness of the paper which is separated from the fixing roller. That is, the radius of curvature R is favorably, 0.005–0.1 mm, more favorably, 0.01–0.06 mm, and most favorably, 0.01–0.05 mm. If the radius of curvature R of the stripping finger 1 at its tip is greater than the thickness of the paper, the stripping finger 1 is incapable of separating the paper favorably from the fixing roller, thus causing paper to be jammed. On the other hand, if the radius of curvature R of the stripping finger 1 at its tip is smaller than the specified smallest angle, the tip of the stripping finger 1 may be damaged while it is handled.

When the thickness of a counter roller in its axial direction is 0.5–5 mm, the tip of the stripping finger 1 retains the mechanical strength in use and allows the degree of damage of the counter roller to be minimized. The tip of the stripping finger 1 is loaded at 50 gf or less, particularly in the range of about 1–30 gf, in a normal operating condition.

The function of the stripping finger 1 having the above-described configuration is that one of two sides, at the front end thereof, forming an acute angle therebetween slides in contact with the peripheral surface of the fixing roller at a required angle, while the other end thereof scoops the end of the paper and guides it backward, thus separating it from the fixing roller smoothly. Because the stripping finger 1 is in contact with the fixing roller, the heat of the fixing roller is transmitted thereto. Thus, the body and the tip of the stripping finger 1 are required to have heat resistance to such an extent that it is not deformed or deteriorated by high temperatures in the range of 170–200° C. Because the stripping finger 1 of the present invention is made of the glass polymer, its glass transition temperature(Tg) is 320–350° C. Thus, it is highly resistant to high temperatures.

As defined in Laid-Open Japanese Patent Publication No. 7-309634, the glass polymer according to the present invention is a homogeneous mixture or an alloy having an uniform fine grain micro-structure accompanied by a reaction at the interface between a glass phase and a resinous phase. That is, the uniform fine grain micro-structure means (1) a micro-structure consisting of an interconnected and co-continuous spinodal type; (2) a micro-structure consisting of a fine spherical, ellipsoidal, and/or serpentine particles of glass and/or glass-ceramic separated by thin membranes of a polymer (or conversely, a micro-structure consisting of the polymer thin film separated from the glass grains); (3) a fine emulsion of glass grains dispersed in polymer (or conversely, fine emulsion of polymer dispersed in glass); (4) a micro-structure in which local areas are phase-inverted, namely, a micro-structure so including continuous two phases or one phase dispersed in the other phase that the region of one phase surrounds a very small portion of the other phase or grains of the other phase. The homogeneous mixture is called an alloy because it has a micro-structure accompanied by a reaction at the interface between the glass phase and the resinous phase.

The glass component comprising the glass polymer is a phosphate glass. For example, the phosphate glass disclosed in Laid-Open Japanese Patent Publication No. 7-309634 can be exemplified. More specifically, the phosphate glass contains at least 65 mol % of a mixture of 28–40 mol % of $P_2O_5$, 10–55 % mol % of ZnO, and 10–35 % of $R_2O$ ($R_2O$ is a single substance of one of 0–25 mol % of $Li_2O$, 0–25 mol % of $Na_2O$, and 0–25 mol % of $K_2O$ or a mixture thereof). The phosphate glass also contains $Al_2O_3$, $B_2O_3$, $Cu_2O$, $Sb_2O_3$, PbO, SnO, $ZrO_2$, $SiO_2$, MgO, CaO, SrO, BaO, MnO, oxides of rare earth elements, and fluoride at an arbitrary mol %. Stabilizer for improving humidity resistance can be added to the phosphate glass. Further, sulfophosphate glass containing $P_2O_5$, ZnO, $R_2O$, and $SO_3$ can be used as a low-melting point glass.

It is preferable that these phosphate glasses have a glass transition temperature(Tg) favorably in the range of 270–420° C. and more favorably in the range of 300–400° C. to allow the stripping finger for the fixing roller to have a sufficient heat resistance.

The following resins can be preferably used to comprise the glass polymer: polysulfone resin, polyarylethersulfone resin, polyether sulfone resin, polyphenyl sulfone resin, polypropylene resin, polyaryletherketone resin, polyolefin resin, ABS resin, polystyrene resin, polyphenylene sulfide resin, polyfluorocarbon resin, polyetherimide resin, liquid crystal polyester resin, polyetherether ketone resin, polyether ketone resin, polyether nitrile resin, polyethylene terephthalate resin, polybutylene terephthalate resin, melamine resin, polyamide resin, polyphosphasen resin, polyacetal resin, polycarbonate resin, epoxy resin, silicone resin, polyimide resin, polyamideimide resin, phenol resin, and diarylphthalate resin. That is, thermoplastic resins having viscosities at which they can be injection-molded when they are melted are preferable.

In forming the homogeneous mixture by using the above-described phosphate glasses and the resins, the resins which form the homogeneous mixture easily can be preferably used: at least one resin selected from the group consisting of the polyetherether ketone resin, liquid crystal polyester resin, polyetherimide resin, polysulfone resin, polyarylether-sulfone resin, and polyphenylsulfone resin. Of these resins, at least one of the resins selected from the polyetherether ketone resin and the liquid crystal polyester resin can be the most favorably used because these resins can form the homogeneous mixture easily and are compatible with the phosphate glass.

The glass polymer is prepared by mixing the selected phosphate glass and the selected resin each in the shape of powder, fine particle or pellet with each other and pelleting the mixture by using a twin-screw melt extruder.

It is preferable that the glass polymer consists of 20–80 wt %, more preferably 50–80 wt %, of the phosphate glass and 20–80 wt %, more preferably 20–50 wt %, of the resin to form the stripping finger by molding.

If the content of the phosphate glass is less than 20 wt %, the stripping finger is prevented from having an improved mechanical characteristic such as wear resistance. On the other hand, if the content thereof is more than 80 wt %, the stripping finger is prevented from having a high degree of impact resistance which is an important characteristic of the stripping finger and having a high moldability, which makes it difficult to injection-mold a mixture containing the phosphate glass.

The following glass polymers can be preferably used in the present invention: Cortem XP8MUJZ known as an alloy of 78 wt % of phosphate glass and liquid crystal polyester resin (trade name: Xydar-SRT-900 manufactured by Dartco Manufacturing Inc.); and SP1MUJZ (trade name: manufactured by Corning Inc.) which is alloy of 78 wt % of phosphate glass, liquid crystal polyester resin (trade name: Xydar-SRT-900+Xydar-SRT-700 manufactured by Dartco Manufacturing Inc.), and polyetherether ketone resin (trade name: PEEK-150P manufactured by ICI Corp.).

According to the present invention, it is preferable to add 5–35 wt % of a filler to the above-described glass polymer. If less than 5 wt %, it does not have a sufficient reinforcing effect on the tip of the stripping finger, whereas if more than 35%, it causes the mixture containing the filler to have a deteriorated moldability. Consequently, it is difficult to injection-mold the mixture containing the filler.

Needle-like whisker is preferably used as the filler of the present invention. When the whisker is added to the glass polymer at the above-described range, it allows the stripping finger to have a sufficient reinforcing effect and injection molding to be accomplished preferably. It is preferable that the PH value of the whisker is in the range of 5–9, more preferable 6–8, to maintain high reliability on the stripping finger molded of the glass polymer. If the PH value thereof is more than 9 to the alkali side, the phosphate glass can be deteriorated and is thus not preferable, whereas if the PH value thereof is less than 5 to the acid side, the whisker gives a bad influence on the resin. As whiskers having the PH in the range of 5–9, a titanium oxide whisker (PH: 6–8), a zinc oxide whisker (PH: 7), a potassium titanate whisker (PH: 7–9), and an aluminum borate whisker (PH: 7.5) can be exemplified.

It is preferable that the whiskers have an average fiber diameter in the range of 0.1–1 $\mu$m, more preferable 0.1–0.5 $\mu$m, and an average fiber length in the range of 1–100 $\mu$m, preferable 1–50 $\mu$m, more preferable 1–30 $\mu$m. Such short fibers reinforce the tip of the stripping finger preferably.

In order to improve wettability and bond strength of the whisker to the glass polymer, the surface of the whisker can be treated with coupling agents such as an aminosilane coupling agent or an epoxysilane coupling agent.

Solid lubricants such as graphite, polytetrafluoroethylene resin, molybdenum disulfide, graphite fluoride can be added to the glass polymer in the range in which they do not deteriorate the above characteristic of the glass polymer. The addition of the solid lubricants greatly reduce the frictional resistance of the stripping finger to the peripheral surface of the fixing roller or the like and allows it to be attacked thereby in a reduced extent.

It is preferable to a coat a thin layer consisting of a fluorine-containing compound on the surface of the stripping finger to reduce the frictional resistance to the fixing roller or the like. The thin layer improves non-attacking property to the fixing roller or the like in a large extent, and prevent toner from attaching thereto.

As the fluorine-containing compound which can be coated on the surface of the stripping finger, a fluorocarbon resin, a fluorinated polyether, a heat-resistant resin containing graphite fluoride and the like can be exemplified. The thin layer of the fluorine-containing compound is coated in a thickness of less than several tens of micrometers on the surface of the stripping finger by applying a solution containing any one of these fluorine-containing compounds thereto and drying or baking it if necessary.

The fluorocarbon resin will be described below. The fluorocarbon resin thin layer can be formed of powder of low-molecular weight resins such as polytetrafluoroethylene resin (PTFE), tetrafluoroethylene-perfluoroalkylvinylether copolymer resin (PFA), tetrafluoroethylene-hexafluoropropylene copolymer (FEP) or dispersion thereof. That is, perfluorocarbon resins (PTFE, PFA, FEP) are preferable. As solutions containing these resins commercially available, Lity SF-301 of enamel type manufactured by Chukoh Chemical Industries Ltd. Tough Coat Enamel TCW-8809BK (trade name) manufactured by Daikin Industries Ltd. is preferable. As fusing type, Teflon PFA-X500CL manufactured by Du Pont-Mitsui Fluorochemicals Co., Ltd. and Vydax AR manufactured by Du Pont.

Further, it is possible to use fluorinated polyether having main structural units of —$C_xF_{2x}$—O— (X: integers 1–4) whose ends are connected with one another with at least one functional group. The number-average molecular weight of polymer of the fluorinated polyether is preferably in the range of 1000–5000. Such fluorinated polyether are commercially available under the trade name of Fomblin Z Disoc and Fomblin Z Deal manufactured by Ausimont Inc. The advantage of the thin layer of the fluorinated polyether coated on the surface of the stripping finger is that because it is very thin (not more than 1 $\mu$m), the original shape of the tip of the stripping finger formed by injection molding does not change after coating.

As methods of applying the solution containing the fluorinated polyether to the surface of the stripping finger, spray coating method, dip coating method, electrostatic deposition method, and powder coating method can be used. When primer coating is required, coating liquid is applied to the surface of the stripping finger in advance.

In order to coat a thin layer on the surface of the stripping finger in a uniform thickness and with high accuracy and in particular in the periphery of the tip thereof, spray coating method can be preferably used. In order to increase the yield of coating solution and use it efficiently, dip coating method is preferable.

It is preferable to dry and fusing the thin layer at a temperature, for example, 250–350° C. at which the fluorocarbon resin is fused.

The thickness of thin layer is in the range of 5–40 $\mu$m, more favorably, 5–30 $\mu$m, and most favorably, 5–20 $\mu$m. If less than 5 $\mu$m, the stripping finger has a deteriorated wear resistance, whereas if more than 40 $\mu$m, the tip thereof is unstable in dimension accuracy.

It is preferable to add a reinforcing agent for improving the wear resistance of the stripping finger and a lubricant to a coating solution consisting of copolymer of tetrafluoroehtylene-perfluoroalkylvinylether of fusing type. In addition, to prevent the stripping finger from being electrified and impart electrical conductivity thereto, an electrically conductive substance such as carbon black or the like may be added to the coating solution.

The thin layer of the fluorinated polyether is coated on the surface of the stripping finger by baking a solution of the fluorinated polyether.

The heat resistant resin containing graphite fluoride for coating the thin layer is described below.

The graphite fluoride is required to have C—C bond or C—F bond. A compound in which high polymer molecules consisting of the C—C bond or the C—F bond and forming a layer structure is preferably used. Such compounds are commercially available in the trade name of Cefbon manufactured by Central Glass Co., Ltd. and Accufluor manufactured by Araid Chemical Inc. of U.S.A.

These compounds are called polycarbon monofluoride having a composition of $(CF)_n$ represented by a hexagonal plate-shaped structure of hexagonal system. But a compound of a polymorphistic structure, for example, a trigonal structure can be used. The graphite fluoride having such a molecular construction is a compound having a low surface energy and has a higher water repellency and oil repellency and a better lubricating property than those of polytetrafluoroethylene resin having a straight-chain structure.

The electrical property of the graphite fluoride can be changed by adjusting the content of fluorine in the composition $(CF)_n$ by a reaction condition and by surface treatment. Thus, the stripping finger can be prepared as an insulating material or an electrically conductive material according to the purpose of use.

Further, the graphite fluoride is superior in oxidation resistance, chemical resistance, stable against solvents such as acid and alkali, and not melt when it is heated. Thus, it is preferably used for the material of a heating/fixing member of an electrophotographic apparatus which is used in an environment subjected to heat and chemicals. In particular, it is preferably used for the material of a stripping finger for a roller of a fixing section, of the electrophotographic apparatus, having a heating means such as a heater.

A coating solution containing fluorocarbons such as the graphite fluoride is prepared by dispersing it at 10–70 wt % in a resin solution of polyimide or polyamideimide.

As methods of applying the coating solution containing the graphite fluoride, drying the coating solution, and adjusting the thickness of the thin layer are carried out in a manner similar to that adopted for the fluorocarbon resin. The heating temperature of the coating solution containing the graphite fluoride is preferably not higher than the initial decomposition temperature of the polyimide or that of the polyamideimide.

The stripping finger of the present invention is applicable to an electrophotographic apparatus in which a recorded pattern is formed on a medium such as a photosensitive material by transmitted electric signals and then, the pattern indicated by an electrical amount is converted into a visible pattern.

More specifically, the stripping finger of the present invention is applicable to image-forming apparatuses such as wet or dry electrostatic copying machines (PPC) of toner image transfer type; and printers such as a laser beam printer (LBP), a liquid crystal shutter (LCD) printer, a printer for facsimile, and a light emitting diode(LED).

The use of the stripping finger of the present invention is not limited to a paper supply section, a photosensitizing section, a fixing section, a paper discharging section of an electrophotographic apparatus, and the like, but can be effectively used for rollers of the fixing section including a fixing roller and pressurizing roller. Above all, the stripping finger of the present invention is suitably used for the fixing roller which is used in a thermally strict condition. Further, the stripping finger can be preferably used in the periphery of the paper discharging side of the fixing roller equipped in a fixing device of dry electrostatic system. The stripping finger is required to have performance of preventing toner from sticking thereto in a higher degree in the dry electrostatic system than in the wet electrostatic system in which toner is prevented from sticking to a stripping finger by application of oil thereto.

EXAMPLES 1–5 AND COMPARATIVE EXAMPLE 1

Materials used in the examples are shown below.
(1) Glass polymer (GP1): Cortem XP8MUJ (trade name, manufactured by Corning Inc.). The GP1 is alloy consisting of 78 wt % of phosphate glass and liquid crystal polyester resin (trade name, Xydar-SRT-900 manufactured by Dartco Manufacturing Inc.).
(2) Glass polymer (GP2) Cortem XP6MUJZ (trade name, manufactured by Corning Inc.) The GP2 is alloy of 72 wt % of phosphate glass and liquid crystal polyester resin (trade name, Xydar-SRT-900).
(3) Glass polymer (GP3): Cortem XP20MUJZ (trade name, manufactured by Corning Inc.) The GP3 is alloy of 73 wt % of phosphate glass, polyetherimide, polysulfone, and polyetherether ketone.
(4) Liquid crystal polyester resin (LCP-1): Xydar-SRT-900 (trade name: manufactured by Dartco Manufacturing Inc.)
(5) Liquid crystal polyester resin (LCP-2): Sumikasuper E5000 (trade name, manufactured by Sumitomo Chemical Co., Ltd.)
(6) Titanium oxide whisker ($TiO_2$): FTL200 (trade name, Ishihara Sangyo Kaisha. Ltd., average fiber length: 3.15 µm, average fiber diameter: 0.27 µm, PH: 6–8)

After mixing the materials in the ratios (part by weight) shown in table 1, each mixture was kneaded sufficiently by a Henshel mixer. Then, each mixture was supplied to a twin-screw melt extruder for extrusion and granulation with a screw revolving speed at 150 rpm. Each pellet thus obtained was molded at an injection pressure of 1700 $kg/cm^2$ and mold temperature 180° C. As a result, test pieces of one-piece stripping finger having the shape shown in FIG. 1 were formed.

Figure 2:
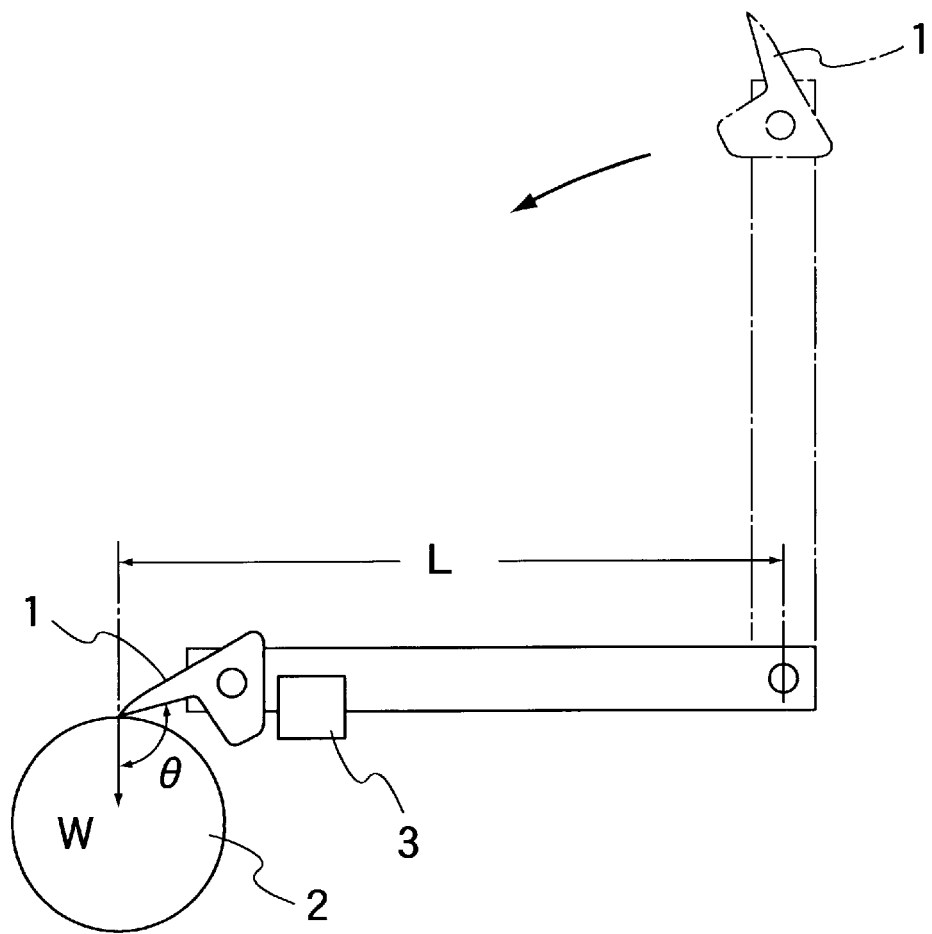
FIG. 2 is a view showing the outline of an impact resistance test.

The following evaluation tests were conducted on each test piece in conformity to the specification and condition of a fixing section of an image-forming apparatus.
(1) Impact Resistance Test FIG. 2 shows the outline of the impact resistance test. A stripping finger 1 was so set on a roller 2 having a diameter of 25 mm that the length between the supporting point of the stripping finger 1 and the tip thereof was 85 mm. A weight 3 was so adjusted that the tip applied a load W of 20 gf to the roller 2. The tip contacted the roller 2 at a contact angle θ of 100°. The stripping finger 1 was rotated naturally from an erect position to a horizontal position to allow the tip of the stripping finger 1 to collide with the roller 2. The number of collisions was measured until the stripping finger 1 was damaged. The maximum number of collisions was 10.
(2) Heat Resistance Test Heat resistance test were conducted in conformity to the condition of a fixing section of an electrophotographic apparatus.

Figure 3:
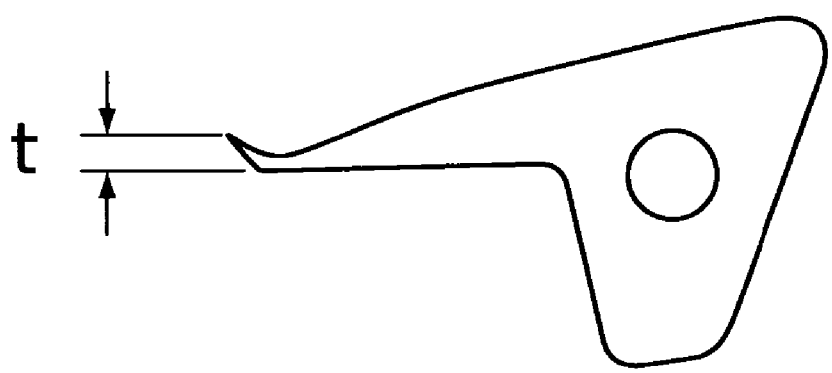
FIG. 3 is a view showing the deformed amount of the tip of the stripping finger of the present invention in a heat resistance test.

The stripping finger 1 was so set on the roller 2 having a diameter of 25 mm that the length between the supporting point of the stripping finger 1 and the tip thereof was 85 mm. The tip applied a load W of 20 gf to the roller 2. The tip contacted the roller 2 at a contact angle θ of 100°. The temperature of the roller 2 was raised by 10° C. per minute. The temperature of the roller 2 was measured when a deformation amount t of the tip shown in FIG. 3 became 40 µm. The maximum temperature was 250° C.
(3) Radius of Curvature R of Tip of Stripping Finger Using a projector V-160 manufactured by Nikon, the radius of curvature R at the tip was measured to find an average value of n=50.

(4) Weld Strength

The weld strength of each test piece was measured based on ASTM D680 (average value of n=5).

(5) Adhesion Strength of Thin Layer of Fluorine-Containing Compound

Using test pieces used in the weld strength test, Tough Coat Enamel TCW-8809BK (coating agent manufactured by Daikin Industries Ltd.) was atomized to the surface of each test piece. Then, the applied coating agent was dried and baked at 260° C. for 30 minutes. Cross cut test was conducted on each thin layer which was formed on the surface of each test piece to examine the adhesion strength thereof. Cross Cut Test: Vertical 11 lines and horizontal 11 lines were formed on the surface of the thin layer of each test piece by a cutter knife which penetrated through the layer and reached the surface of each test piece at intervals of 1 mm to form 100 squares on the thin layer. A cellophane tape was bonded to the surface of the layer of each test piece under pressure and then separated therefrom. The number of thin layers which remained on the surface of each test piece was measured to evaluate the adhesion strength thereof. Table 1 shows the number of thin layers which remained on the surface of each test piece.

(6) Appearance

Inspecting each test piece obtained by injection molding visually, test pieces which had cracks or foaming on their surfaces were marked by "X" and those which were clean thereon were marked by "o".

TABLE 1

| | Example | | | | | Comparative |
|---|---|---|---|---|---|---|
| | 1 | 2 | 3 | 4 | 5 | Example 1 |
| Formulation (Part by wt.) | | | | | | |
| GP-1 | 100 | — | — | 100 | 100 | — |
| GP-2 | — | 100 | — | — | — | — |
| GP-3 | — | — | 100 | — | — | — |
| LCP-1 | — | — | — | 10 | 20 | — |
| LCP-2 | — | — | — | — | — | 100 |
| TiO$_2$ | 10 | — | — | — | — | 10 |
| Glass Content wt% | 71 | 72 | 73 | 66 | 60 | 0 |
| Test Result | | | | | | |
| Inpact Resistance Test, times | 3 | 3~4 | 10< | 10< | 10< *1 | 1~2 |
| Heat Resistance Test, ° C. | 250< | 250< | 250< | 250 | 250< *1 | 240 |
| R of Tip, μm | 15 | 15 | 15 | 15 | 15 | 5 |
| Weld Strength, kgf/mm$^2$ | — | 4.7 | — | — | — | 2.1 |
| Appearance | o | o | o | o | o | x |
| Adhesion Strength | 100 | 100 | 100 | 100 | 100 | — |

Note *1: 10< shows 10 or more. 250< shows 250 or more.

Table 1 indicates that the test piece of each example of the present invention was superior in impact resistance and heat resistance and that the material of the tip of each test piece was molded at an ideal radius of curvature R. Further, the weld strength was more than twice as high as a stripping finger comprising known liquid crystal polyester resin, and the surface of each test piece formed by molding had no defect. Further, it was possible to coat the surface of each test piece with fluorine resin.

On the other hand, the test piece of comparative example 1 consisting of the liquid crystal polyester resin and the whisker was very bad in impact resistance and further, foam was formed on the surface thereof. Moreover, crack occurred at the weld portion. Thus, the test piece of comparative example 1 cannot be used for a fixing roller or the like.

Because the stripping finger of the present invention is a molded glass polymer consisting of phosphate glass and resin, it is superior in moldability, thus solving the problem of filling of resin at the tip thereof. Further, the stripping finger does not attack the peripheral surface of the fixing roller or the like, has a sufficient degree of heat resistance, and maintains the original shape of the tip thereof.

As the glass polymer comprises of 20–80 wt % of phosphate glass and 20–80 wt % of resin mixed with, the stripping finger has a sufficient degree of impact resistance.

The glass polymer contains 5–35 wt % of filler. The filler is a whisker having a PH value in the range of 5–9. The resin is selected from the group of liquid crystal polyester resin, polyetherimide resin, polysulfone resin, and polyetherether ketone resin. Thus, the stripping finger is excellent in mechanical characteristics such as weld strength, heat deformation property, and the like. Consequently, the present invention provides the stripping finger which can be designed without much limitations.

Because the thin layer of a fluorine-containing compound is coated on the surface of the stripping finger, the surface thereof is superior in the property of preventing toner from sticking thereto and highly resistant to frictional wear. Thus, the stripping finger is highly dependable.

What is claimed is:

1. A glass polymer molded stripping finger for an electrophotographic apparatus, said glass polymer comprising a phosphate glass and a resin.

2. A stripping finger according to claim 1, wherein a glass transition temperature (Tg) of said phosphate glass is 270–420° C.

3. A stripping finger according to claim 2, wherein said phosphate glass comprises P$_2$O$_5$, ZnO, and R$_2$O, wherein R consists of one element selected from the group consisting of Li, Na, and K.

4. A stripping finger according to claim 1, wherein said resin comprises at least one resin selected from the group consisting of a liquid crystal polyester resin, a polyetherimide resin, a polysulfone resin, and a polyetherether ketone resin.

5. A stripping finger according to claim 4, wherein said resin is said liquid crystal polyester resin.

6. A stripping finger according to claim 4, wherein said resin is said liquid crystal polyester resin and said polyetherether ketone resin.

7. A stripping finger according to claim 1, wherein said glass polymer consists essentially of 20–80 wt % of said phosphate glass and 20–80 wt % of said resin.

8. A stripping finger according to claim 7, wherein said glass polymer further comprises 5–35 wt % of a filler.

9. A stripping finger according to claim 8, wherein said filler comprises a whisker having a PH value in the range of 5–9.

10. A stripping finger according to claim 9, wherein said whisker comprises at least one whisker selected from the group consisting of a titanium oxide whisker, a zinc oxide whisker, a potassium titanate whisker, and a aluminum borate whisker.

11. A stripping finger according to claim 10, wherein said whisker is the titanium oxide whisker.

12. A stripping finger according to claim 11, wherein a thin layer of a fluorine-containing compound is formed on a surface of said stripping finger.

13. A stripping finger according to claim 12, wherein said fluorine-containing compound comprises at least one resin selected from the group consisting of a fluorocarbon resin, a fluorinated polyether, and a heat resistant resin containing graphite fluoride.

14. A stripping finger according to claim 1, said stripping finger used at a fixing section of said electrophotographic apparatus.

* * * * *